UNITED STATES PATENT OFFICE.

FREDK. LANGENHEIM, OF PHILADELPHIA, PENNSYLVANIA.

IMPROVEMENT IN PHOTOGRAPHIC PICTURES ON GLASS, &c.

Specification forming part of Letters Patent No. 7,784, dated November 19, 1850.

*To all whom it may concern:*

Be it known that I, FREDERICK LANGENHEIM, of the city and county of Philadelphia, and State of Pennsylvania, have invented a new and improved mode of hightening the effect of transparent pictures represented on glass or any other transparent or semi-transparent material, at the same time protecting them from injury; and I do hereby declare that the following is a full and exact description.

The nature of my invention consists in placing a semi-transparent material or substance—for example, ground or frosted glass—in front or behind the said transparent picture, the effect of which is to concentrate the light in the ground or frosted glass, at the same time preventing objects behind the picture from being visible through the lighter or more transparent parts of the picture, and which ground or frosted glass also protects the picture from external injury.

In order to use my improvement to the best advantage, a ground or frosted glass or other semi-transparent material is procured of the exact size of the glass or transparent material, on which the picture is taken or represented with the ground or frosted surface next to the picture, and both glasses are then secured together by means of glue-paper put round the edges. By placing the picture near a window, or placing it in such position that a stronger light is in the rear of the picture, the best effect is produced. I apply generally white plate-glass or stained glass of different colors; or I grind the opposite side of the glass or semi-transparent material on which the picture is to be taken or after it is taken.

What I claim as my invention, and desire to secure by Letters Patent, is—

The combination of the ground or frosted glass or other semi-transparent substance interposed, in connection with the picture, between the source of light and the spectator, substantially as described in the foregoing specification.

FREDERICK LANGENHEIM.

Witnesses:
O. T. EDDY,
F. SCHREIBER.